(No Model.)
J. B. KEARNEY.
NUT LOCK.
No. 579,151. Patented Mar. 23, 1897.
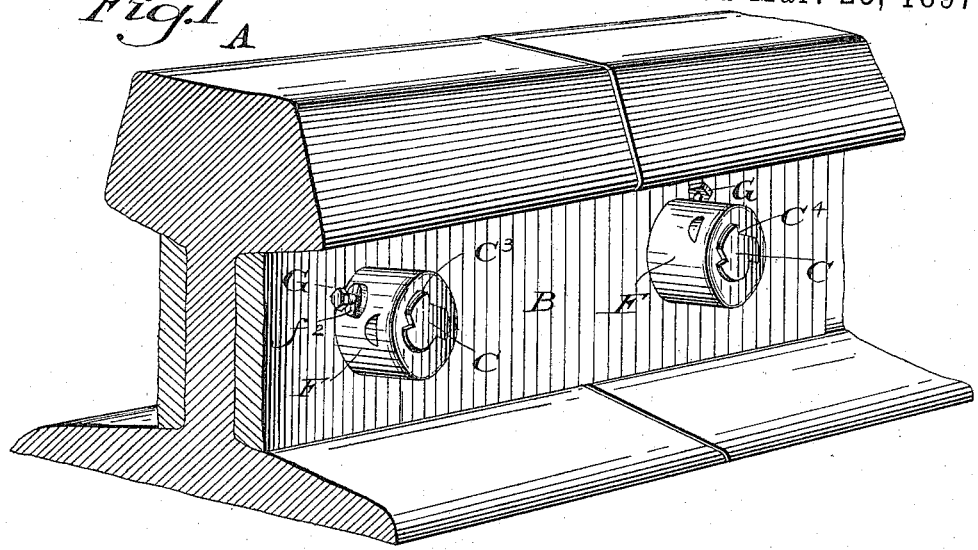
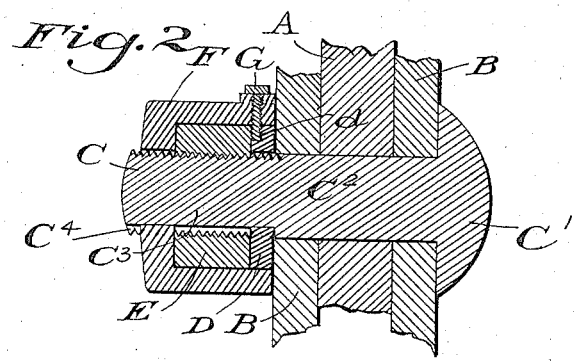
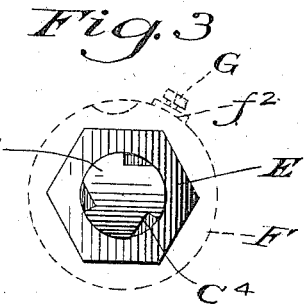
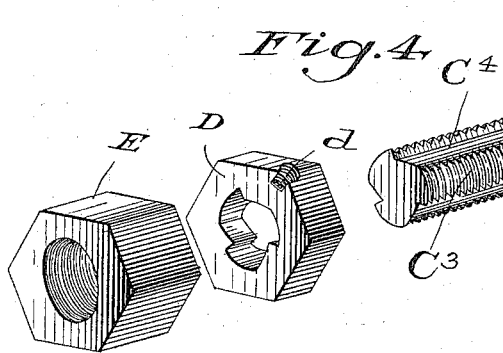
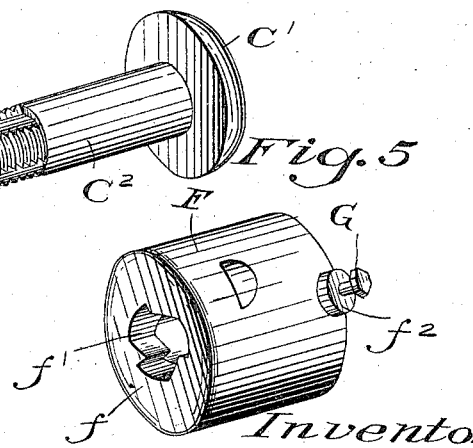
Witnesses
B. Kruefer
C. H. Zahler
Inventor.
John B. Kearney
By his Atty. O. B. Reichell

UNITED STATES PATENT OFFICE.

JOHN B. KEARNEY, OF CANYON, COLORADO.

NUT-LOCK.

SPECIFICATION forming part of Letters Patent No. 579,151, dated March 23, 1897.

Application filed November 16, 1896. Serial No. 612,238. (No model.)

*To all whom it may concern:*

Be it known that I, JOHN B. KEARNEY, a citizen of the United States, residing at Canyon, in the county of Fremont, State of Colorado, have invented certain new and useful Improvements in Nut-Locks, of which the following is a specification.

The object of my invention is to provide a nut-locking device which will strengthen and protect the threaded end of the bolt, and also protect the nut and prevent it from jarring loose, even should some of the threads of the bolt or nut become stripped or loose because of their not being properly fitted.

My invention consists, primarily and generally, in a bolt provided with longitudinal serrated clutch-seats or channels, a screw-nut, a clutch-washer punched to fit said bolt and its serrated clutch-seats, a locking-cap, also punched to fit the end of said bolt and its serrated clutch-seat, and a set-bolt fitted through the said locking-cap to impinge upon the clutch-washer, the said cap serving to hold the parts securely together, and also protect them from exposure to the elements.

In the accompanying drawings, Figure 1 is a perspective view of a railroad-rail joint, the end of the rail and the fish-plates being shown in section with two of my improved bolts and nut-locks applied thereto; Fig. 2, a transverse sectional view through the said rail-joint with the bolt and nut lock shown in longitudinal section; Fig. 3, an end view of the nut and bolt in full lines and of the locking-cap in dot lines; Fig. 4, a perspective view of the bolt, clutch-washer, and nut detached; and Fig. 5 a perspective view of the locking-cap from the cover end thereof.

In order to show the practical application of my device, two ordinary railroad-rails A, having fish-plates B of the usual form, as shown in Figs. 1 and 2, are punched to receive bolts C, having the usual head C' and cylindrical body $C^2$, of sufficient length to pass through the web of the rail and also through both of the fish-plates, the bolt being extended beyond the body $C^2$ a sufficient distance to provide a threaded section $C^3$ to receive the clutch-washer D, screw-nut E, and cover end of the locking-cap F, as clearly shown in Fig. 2, the threaded section of the bolt being thus completely covered and protected from the weather and from injury.

The threaded section $C^3$ of the bolt has preferably three longitudinal serrated clutch-seats $C^4$ therein, which extend from the extreme end of the bolt to the smooth cylindrical portion thereof. The threads are cut in the usual way, and grooves or clutch-seats $C^4$ may be formed in any preferred manner, preferably by rotary cutters or dies. The clutch-washer D is punched out by the usual means and has a central bolt-hole adapted to fit snugly around the exterior circumference of the threads and into the channels or clutch-seats $C^4$ thereof and to slide freely upon the bolt, and is provided with a set-bolt hole $d$ therein, as will hereinafter appear.

The nut E, as herein shown, is of the usual hexagonal pattern and is adapted to fit the threads and screw freely upon the bolt and press the clutch-washer D closely against the face of the fish-plate.

The locking-cap F has an end cover $f$, punched out at $f'$, to conform to the cross-section of the extreme end of the bolt and closely fit the same, and the inner wall thereof may be either a smooth cylindrical surface or a hexagonal or other form of cross-section to closely fit the nut and clutch-washer.

The locking-cap F has near its inner open end a raised base or thickened section $f^2$, which is bored or otherwise perforated and threaded to receive a set-nut G, which passes through it and engages with the hole or depression $d$ in the clutch-washer, by which means the locking-cap, nut, and washer are fixedly secured together longitudinally and prevented from turning thereon by the engagement of the serrations of the clutch-washer and cover end of the clutch-cap with the longitudinal clutch-seats of the bolt.

It will be readily seen that the nut, although fitted loosely upon the end of the bolt, will be absolutely prevented from turning thereon and may, when thus loosely fitted, be more readily placed on and off the end of the bolt without stripping or injuring the thread of the bolt or nut.

The end of the bolt is somewhat weakened by the longitudinal slots or clutch-seats, but the clutch-cap, which fits snugly over the end of the bolt, nut, and washer and secured thereto, as above described, reinforces the end of the bolt, and if need be may be made to give greater strength and rigidity to the bolt at its threaded and slotted end than at other portions thereof. The device is not expensive, the clutch-cap and the additional expense of cutting the clutch-seats in the bolts comprising the additional cost over an ordinary bolt, nut, and washer without a nut-locking device.

It is evident that the clutch-washer may be dispensed with and the nut be locked by the clutch-cylinder and stud-bolt, but the device described is preferable and more secure.

I claim as my invention and desire to secure by Letters Patent—

1. A nut and bolt lock comprising a bolt having longitudinal clutch-seats, a clutch-washer of corresponding cross-section, a nut, a clutch-cylinder having a cover end to fit the end of the bolt and a stud-bolt, to hold the said cylinder upon the washer substantially as described.

2. A nut and bolt lock comprising a bolt provided with longitudinal clutch-seats, a nut screw-threaded to fit thereon, a clutch-cap to fit over said nut and over the end of the bolt, and a stud-bolt fitted upon the clutch-cap substantially as described.

In testimony that I claim the foregoing as my invention I have signed my name in the presence of two subscribing witnesses.

JOHN B. KEARNEY.

Witnesses:
EMEL STAKDOF,
JAMES E. HASBROUCK.